United States Patent
Sansone

(10) Patent No.: US 12,316,432 B2
(45) Date of Patent: May 27, 2025

(54) EXTENDED SATELLITE TELECOMMUNICATION SYSTEM AND VIRTUAL HUB MODULE THEREOF

(71) Applicant: neXat SA, Auderghem (BE)

(72) Inventor: Fulvio Sansone, Brussels (BE)

(73) Assignee: neXat SA, Auderghem (BE)

( * ) Notice: Subject to any disclaimer, the term of this patent is extended or adjusted under 35 U.S.C. 154(b) by 367 days.

(21) Appl. No.: 17/786,847

(22) PCT Filed: Dec. 8, 2020

(86) PCT No.: PCT/EP2020/085087
§ 371 (c)(1),
(2) Date: Jun. 17, 2022

(87) PCT Pub. No.: WO2021/122161
PCT Pub. Date: Jun. 24, 2021

(65) Prior Publication Data
US 2023/0029893 A1 Feb. 2, 2023

(30) Foreign Application Priority Data
Dec. 20, 2019 (NL) ..................................... 2024538

(51) Int. Cl.
*H04B 7/185* (2006.01)
(52) U.S. Cl.
CPC ..... *H04B 7/18513* (2013.01); *H04B 7/18517* (2013.01)

(58) Field of Classification Search
CPC .................. H04B 7/18513; H04B 7/18517
USPC ............................................... 370/316
See application file for complete search history.

(56) References Cited

U.S. PATENT DOCUMENTS 9,680,559 B1\* 6/2017 Freedman ............ H04B 7/1851
2018/0077067 A1\* 3/2018 Dowlatkhah ....... H04L 12/4641

OTHER PUBLICATIONS

PCT International Search Report and Written Opinion, Application No. PCT/EP2020/085087, mailed Feb. 8, 2021, 10 pages.

\* cited by examiner

*Primary Examiner* — Christopher R Crompton
(74) *Attorney, Agent, or Firm* — McDonnell Boehnen Hulbert & Berghoff LLP

(57) ABSTRACT

A satellite telecommunication system for effecting communication between a network and remote systems via forward and return satellite links, the satellite telecommunication system comprising: a gateway configured for establishing the forward and return satellite links; wherein the gateway comprises a satellite hub configured for receiving outgoing data and for transmitting said outgoing data to at least one of the remote systems; wherein a first traffic controlling module of the satellite hub is configured for obtaining a first flow of the outgoing data such that said first flow follows a predetermined traffic profile; a virtual hub module configured for forwarding, from the network, the outgoing data to the satellite hub; wherein a second traffic controlling module of the virtual hub module is configured for obtaining a second flow of the outgoing data forwarded from the virtual hub module such that said second flow is unchanged by the first traffic controlling module.

16 Claims, 4 Drawing Sheets

EXTENDED SATELLITE TELECOMMUNICATION SYSTEM AND VIRTUAL HUB MODULE THEREOF

CROSS-REFERENCE TO RELATED APPLICATIONS

This application is a national stage application under 35 U.S.C. § 371 of International Application No. PCT/EP2020/085087, filed Dec. 8, 2020, which claims the benefit of priority from Netherlands Application No. 2024538, filed Dec. 20, 2019. The disclosures of all of the above applications are incorporated by reference herein in their entireties.

FIELD OF INVENTION

The present invention relates to satellite telecommunication systems and virtual hub module thereof. Particular embodiments of the invention relate to a satellite telecommunication system and a virtual hub module thereof which are extended in control.

BACKGROUND

Usually, when establishing and controlling satellite communication between a network, e.g. Internet, and remote systems, several functions, e.g. shaping, management, and control, are centralized at the level of a satellite hub included in a gateway, or teleport, for satellite communication. These functions allow the provision of various services. However, many parameters are influential on the type of services provided. First of all, the satellite communication may be performed on different frequencies: the Ku-band, the C-band, and the Ka-band. Also, the satellite hub may differ in technology depending on the manufacturer. And finally, the satellite hub may have functions differing in operation depending on the satellite teleport operator. Thus, the various services provided are far from standardized, and the users of the services are entirely dependent on external parameters out of their control for a given type of services. It would therefore be advantageous to provide a satellite telecommunication system and virtual hub module thereof which offer an extended control on the services provided by the satellite hub.

It is already possible to tweak the given type of services of the satellite hub. However, these tweaks are merely minor variations of the services and are ultimately bounded by the parameters mentioned above, such as the satellite hub manufacturer, and the satellite teleport operator. Thus, if a specific service is needed by the users, one must choose between different sets of parameters. Still, depending on the regional access to the gateway for satellite communication, all sets of parameters might not be available; or by selecting a service in one set of parameters one might exclude another desired service not available in said one set. Freedom in the choice of services is limited. Also, the categories of users, e.g. satellite hub operator and its direct customers, being able to access to the management and control on said services may be restricted. Therefore, there is a need for a satellite telecommunication system and a virtual hub module thereof which can provide an extended control within the types of services offered.

SUMMARY

The object of embodiments of the invention is to provide a satellite telecommunication system and virtual hub module thereof which can offer more freedom in the choice of services available to a user and which is less constrained by the communication frequency, satellite hub manufacturer, or satellite teleport operator. More in particular, embodiments of the invention aim to provide a satellite telecommunication system and virtual hub module thereof which allow bypassing some of the constraints of the satellite hub included in the gateway for satellite communication.

According to a first aspect of the invention, there is provided a satellite telecommunication system for effecting communication between a network and remote systems via a forward satellite link and a return satellite link The satellite telecommunication system comprises a gateway and a virtual hub module.

The gateway, or teleport, is configured for establishing the forward satellite link and the return satellite link to the remote systems. The gateway comprises a satellite hub including a first traffic controlling module. The satellite hub is configured for receiving outgoing data and for transmitting said outgoing data to at least one of the remote systems via the forward satellite link The first traffic controlling module of the satellite hub is configured for obtaining a first flow of the outgoing data being transmitted from the satellite hub, such that said first flow follows a predetermined traffic profile.

The virtual hub module includes a second traffic controlling module. The virtual hub module is configured for forwarding, from the network, the outgoing data to the satellite hub. The second traffic controlling module of the virtual hub module is configured for obtaining a second flow of the outgoing data being forwarded from the virtual hub module, such that said second flow is unchanged by the first traffic controlling module. In other words, the second flow is shaped by the second traffic controlling module to correspond to the predetermined traffic profile as required by the first traffic controlling module of the satellite hub. In effect, the first flow will be similar to the second flow.

Generally, it is essentially impossible for a user to be provided with services outside the given type of services imposed by a determined set of satellite teleport operator, satellite hub manufacturer, and communication frequency. The user is thus constrained to an initially limited choice of services which may be further limited by the local market availabilities. Also, the management and control on said services may be restricted to some categories of users. This problem is overcome by a satellite telecommunication system as defined above.

More specifically, in the prior art, the outgoing data coming from the network, e.g. Internet, and intended to be transmitted to at least one of the remote systems has to pass through the satellite hub to be able to access the forward satellite link established by the gateway. The traffic controlling module of the satellite hub will, for each data packet of the outgoing data, transfer the data packet of the outgoing data, reroute it, delay it, or reject it. For example, the treatment of each data packet by the traffic controlling module of the satellite hub may be done according to the services subscribed by the user associated with the at least one of the remote systems and its status of data consumption. The data consumption may be related to a time-based or a volume-based measurement of passing traffic data. The term "traffic data" may be defined as data which is outgoing and/or incoming between at least one of the remote systems and the network.

However, the services provided to the users and linked to the capabilities of the satellite hub will be essentially limited by the few services developed by the satellite hub manufacturer, each different satellite hub manufacturer proposing few different types of services not always adapted to the needs of the market. Additionally, the access rights to these services will be limited to the select few categories of users, e.g. users in touch with the satellite hub operator, far from covering the full value chain between the network and the end-users.

The virtual hub module according to the present invention is located between the network and the gateway. The outgoing data coming from the network, e.g. Internet, and intended to be transmitted to at least one of the remote systems has to pass through the satellite hub to be able to access the forward satellite link established by the gateway. The satellite hub includes the first traffic controlling module which is configured to obtain, or shape, the first flow of the outgoing data. To be transmitted, the first flow of the outgoing data is required to follow a predetermined traffic profile. The predetermined traffic profile may depend on the overall quality of the forward satellite link connectivity, or on parameters of the at least one remote systems, or on settings of the satellite hub itself. To obtain the predetermined traffic profile, the first traffic controlling module may, for each data packet of the outgoing data, transfer the data packet of the outgoing data, reroute it, delay it, or reject it. The obtaining, or shaping, of the first flow is made in real-time to adopt the predetermined traffic profile.

More particularly, obtaining the first flow may be equivalent to traffic shaping, or packet shaping, It is a congestion management method that regulates network data transfer by delaying the flow of, or even dropping, less important or less desired packets. It is used to optimize network performance by prioritizing certain traffic flows and ensuring the traffic rate does not exceed the bandwidth limit. Regulating the flow of packets into a network is known as data transfer throttling. Regulation of the flow of packets out of a network is known as rate limiting. The traffic shaping to obtain the predetermined traffic profile is performed in the transport layer of the network, and data transfer is generally done using a TCP/IP protocol.

The virtual hub module includes the second traffic controlling module. The second traffic controlling module will, for each data packet of the outgoing data, transfer the data packet of the outgoing data, reroute it, delay it, or reject it. For example, the treatment of each data packet by the second traffic controlling module may be done according to the services subscribed by the user associated to the at least one of the remote systems and its status of data consumption. The data consumption may be related to a time-based or a volume-based measurement of passing traffic data.

The second traffic module is configured to obtain the second flow of the outgoing data such that it corresponds to the predetermined traffic profile. Since the virtual hub module interfaces the outgoing data with the satellite hub and the second flow of the outgoing data corresponds to the predetermined traffic profile of the first traffic module included in the satellite hub, the outgoing data as obtained in the second flow is unchanged by the first traffic controlling module. The first traffic controlling module is thus effectively bypassed in its role and does not perform any shaping since the first flow will be coinciding the second flow; and the given types of services initially constrained by the choice of the satellite hub is no more restricted by it. It is to be noted that obtaining the first flow is not performed sequentially after obtaining the second flow, but simultaneously.

According to an exemplary embodiment, the virtual hub module is further configured for forwarding, from the network, the outgoing data to another satellite hub including another traffic controlling module different from the first traffic controlling module.

In this way, the virtual hub module may be used independently of the satellite hub configuration and allows having similar types of services for different traffic controlling modules on any satellite hub. The offering of services may be any one of the following types: dedicated services, contended services with Peak Information Rate and Committed Information Rate, volume-based voucher shared services, time-based voucher services, Fair Usage Policy-based shared services, Virtual Networks Operator services, multicast, back-up services, high availability services. The skilled person will understand that the types of services provided are not limited by the above list and that the types of services provided may be a "mix-and-match" of the above.

According to a preferred embodiment, the another satellite hub is comprised by another gateway.

In this manner, the virtual hub module allows providing multi-satellite services and obtaining extended control independently of the regional constraints. For example, the virtual hub module may be cloud-based and thus may be connected to a plurality of gateways irrespective of their locations.

According to an exemplary embodiment, the second traffic controlling module comprises a traffic database for storing a plurality of traffic policies. The second traffic controlling module is configured for obtaining the second flow based on the plurality of traffic policies.

In this way, the second flow obtaining is controllable via the plurality of traffic policies. The plurality of traffic policies may influence the actions of transferring, rerouting, delaying, and/or rejecting each data packet of the outgoing data. These actions, usually performed by the first traffic controlling module and which are now delegated to the second traffic controlling module, are thus customizable through the plurality of traffic policies set up. Hence, the types of services provided may depend on the traffic policies instead of on the satellite hub.

According to a preferred embodiment, the plurality of traffic policies comprises bandwidth limiting policies, traffic priority policies, traffic rerouting policies, and/or outgoing data volume policies.

In this manner, the scopes of available policies are well categorized in service classes and the types of services may be, as a consequence, defined following various desired services profiles. Since various services profiles may be defined, different levels of controls associated with access rights may also be provided to different users based on their categories and/or roles in the value chain between the network and the end-user.

According to an exemplary embodiment, the virtual hub module further includes a management and monitoring module. The management and monitoring module is configured for managing and monitoring the communication between the network and the remote systems.

In this way, the remote systems connected to the network via the forward satellite link and the return satellite link may be more easily managed and monitored by the virtual hub module. The management and monitoring of the communication may thus be delegated to the virtual hub module instead of being restricted by the satellite hub. Depending on the access rights provided to the virtual hub module, various users may be allowed to manage their own Internet Protocol (IP) traffic and/or manage the remote systems, as well as monitoring them. Additionally, the categories of users being able to access management and monitoring over the communication between the network and the at least one of the remote systems may be expanded to, for example, satellite operators, satellite teleport operators, satellite hub operators, internet service providers (ISP), local internet service providers (L-ISP), corporate-level end-users, individual-level end-users.

According to an embodiment, the management and monitoring module is further configured for generating and managing a data volume voucher upon request by the user, e.g. the L-ISP, the ISP. The generating of the volume voucher includes the generation of a unique URL based on a unique identifier associated to the user. The data volume voucher may allow granting connection to the network for a predefined amount of traffic data and/or period of time upon validation of the voucher code by, for example, a subscriber. In an embodiment, the user may further define via the management and monitoring module services linked to the unique URL, and using this URL, provide subscribers with voucher codes associated to the services defined.

In this manner, since the virtual hub module allows bypassing the first traffic controlling module, the user, e.g. the L-ISP, the ISP, may provide data volume vouchers to the end-users with similar conditions as operators upstream in the value chain between the network and the end-users.

According to another aspect of the invention, there is provided a voucher generation sub-module. The voucher generation sub-module is configured for generating and managing a data volume voucher upon request by the user. The generating of the data volume voucher includes the generation of a unique URL based on a unique identifier associated to the user, e.g. the ISP, the L-ISP. The skilled person will understand that the implementation of the voucher generation sub-module is not limited to the virtual hub module.

According to a preferred embodiment, the second traffic controlling module comprises a tracking unit connected to the management and monitoring module and configured for tracking, for each of the remote systems, the outgoing data volume being transmitted. Optionally, the tracking unit may also track, for each of the remote systems, the incoming data volume being received. The tracking by the tracking unit may be performed at the level of the network.

In this manner, the outgoing data can be attributed, by volume, to each of the remote systems, and the management and monitoring of each of the remote systems may be individualized based on a measured parameter.

According to an exemplary embodiment, the satellite hub further comprises a supervision database for storing supervision data. The satellite hub is further configured for collecting, from the remote systems, the supervision data in parallel with the outgoing data. The management and monitoring module is further configured for reading the supervision data of the supervision database. The supervision data may comprise at least one of: signal quality data at the satellite hub, signal quality data at the at least one of the remote systems, volume of traffic data exchanged between the satellite hub and the at least one of the remote systems, temperature of the at least one of the remote systems, satellite communication channel identification used by a mobile remote system. It is to be noted that, provided there is no disturbance, the volume of traffic data exchanged between the satellite hub and the at least one of the remote systems should be comparable to the tracking by the tracking unit.

In this way, the management and monitoring module may have access to additional data related to the communication between the network and the at least one of the remote systems. Since the supervision data is separated from the traffic data, supervision data may be independently treated and follow, for example, a different communication protocol, e.g. for additional security, easier activity tracking, better efficiency. By allowing the management and monitoring module to read the supervision data of the supervision database, the management and monitoring module may store a copy of the supervision data within the virtual hub module. Additionally, the stored copy of the supervision data may be accessed in a read/write manner and may be furthered processed by the management and monitoring module.

According to a preferred embodiment, the management and monitoring module comprises a logging database. The logging database is configured for logging the user input data.

In this manner, the user input data may be easily backtracked and processed afterwards.

According to an exemplary embodiment, the virtual hub module further includes an activity processing module configured for processing the user input data, logged in the logging database of the management and monitoring module, according to a predetermined template.

In this way, the user input data may be processed in order to isolate some predetermined inputs or categories of inputs among the user inputs. The predetermined template may be chosen depending on the categories of user inputs aimed at. Indeed, the user inputs may be related to different categories such as the management of remote systems life cycle (provisioning, decommissioning, activation, suspension, reactivation, Service Level Agreement change), the management of volumes (manual resets of traffic data volume, generation and management of data volume vouchers), and the management of the virtual hub module users and access rights. Optionally, a need for technical assistance may also be processed by the activity processing module in this manner.

According to a preferred embodiment, the management and monitoring module is further configured for modifying at least one traffic policy of the traffic policies stored in the traffic database or for storing another traffic policy in the traffic database, based on the user input data.

In this manner, the plurality of traffic policies may be implemented and/or modified more flexibly.

According to an exemplary embodiment, at least one remote system of the remote systems is a polling system. The virtual hub module further includes a performance metering module configured for metering a connectivity performance of the polling system via the forward satellite link and the return satellite link.

In this way, a point of control is established in order to check the connectivity quality. It allows users of the virtual hub module to monitor connectivity between the network and remote systems, and gather information related to service degradation or deviations from nominal performances. The connectivity performance of the polling system may be metered using the Return Trip Time (RTT), and/or for speed tests in order to assess with direct measurements the level of congestion in the outgoing data. It is advantageous to have a polling system equipped with 24/7 reliable power supply to ensure there are no false signals just due to local power failure. Additionally, there may be more than one polling system among the plurality of remote systems.

According to a preferred embodiment, the performance metering module is further configured for sending a warning message to the user upon metering a level of the connectivity performance below a predetermined level.

In this way, mishaps of the satellite telecommunication system may be detected consistently, and thus solved more quickly in order to provide a reliable service.

According to an exemplary embodiment, the satellite hub is configured for transmitting the outgoing data via the Ku-band, the C-band, or the Ka-band.

The skilled person will understand that the hereinabove described technical considerations and advantages for satellite telecommunication system embodiments also apply to the below described corresponding virtual hub module embodiments, mutatis mutandis.

According to a second aspect of the invention, there is provided a virtual hub module for forwarding, from a network, outgoing data to a satellite hub. The virtual hub module comprises a traffic controlling module. The traffic controlling module is configured for obtaining a flow of the outgoing data being forwarded from the virtual hub module such that the flow is unchanged by a hub traffic controlling module included in the satellite hub.

According to a preferred embodiment, the virtual hub module is further configured for forwarding, from the network, the outgoing data to another satellite hub including another hub traffic controlling module different from the hub traffic controlling module.

BRIEF DESCRIPTION OF THE FIGURES

This and other aspects of the present invention will now be described in more detail, with reference to the appended drawings showing a currently preferred embodiment. Like numbers refer to like features throughout the drawings.

DESCRIPTION OF EMBODIMENTS

Figure 1:
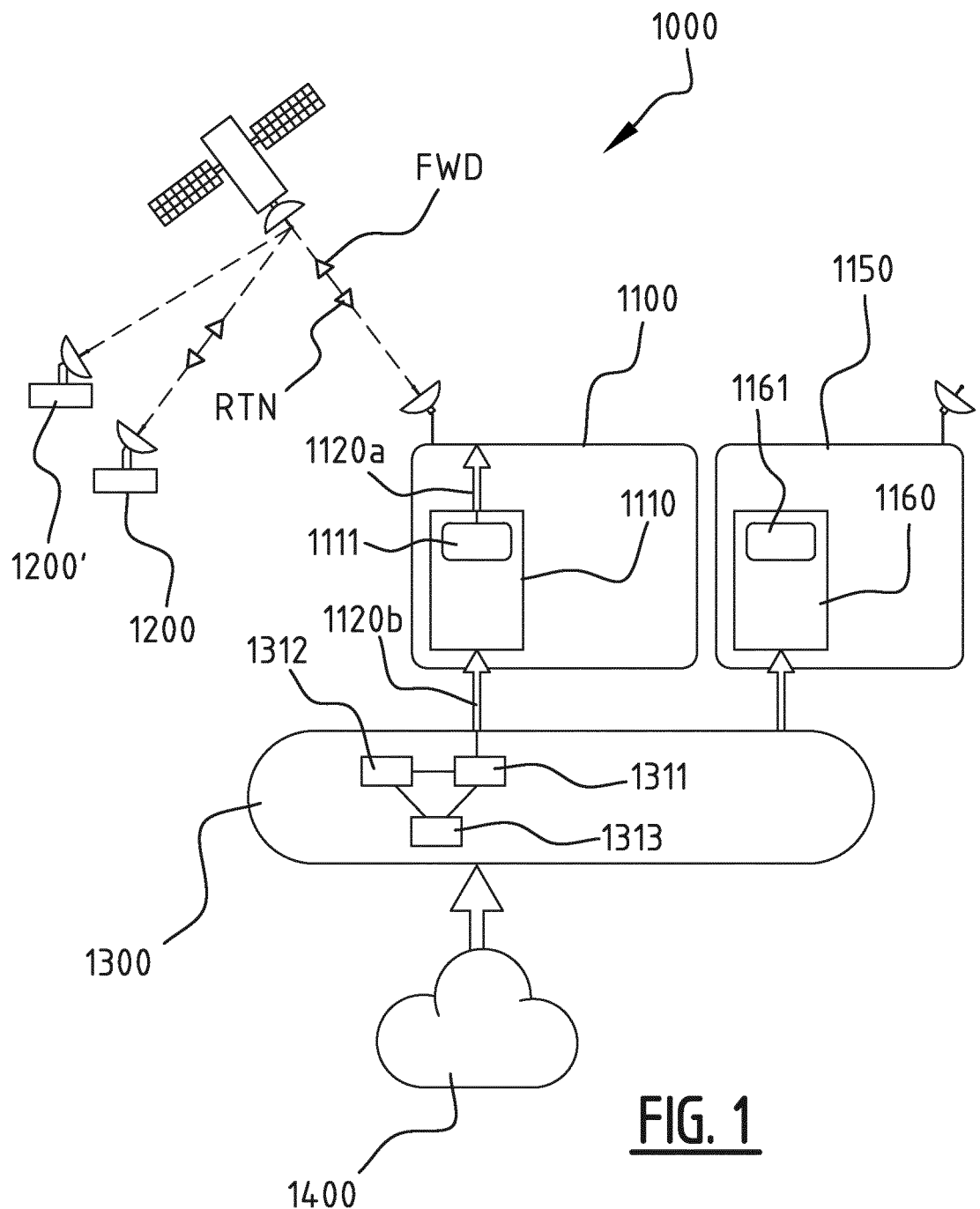
FIG. 1 shows a schematic view of an exemplary embodiment of a satellite telecommunication system.

FIG. 1 shows a schematic view of an exemplary embodiment of a satellite telecommunication system according to the present invention. The satellite telecommunication system 1000 comprises a gateway 1100, or teleport, and a virtual hub module 1300. The satellite telecommunication system 1000 is provided for effecting communication between a network 1400 and remote systems 1200 via a forward satellite link FWD and a return satellite link RTN. The virtual hub module 1300 may include a second traffic controlling module 1311, a management and monitoring module 1312, and an activity processing module 1313. These modules 1311, 1312, and 1313 will be described in more details with reference to FIG. 2, FIG. 3, and FIG. 4, respectively.

The gateway 1100 is configured for establishing the forward satellite link FWD and the return satellite link RTN to the remote systems 1200. The gateway 1100 comprises the satellite hub 1110 including a first traffic controlling module 1111. The outgoing data coming from the network 1400, e.g. Internet, and intended to be transmitted to at least one of the remote systems 1200 has to pass through the satellite hub 1110 before accessing the forward satellite link FWD established by the gateway 1100.

The first traffic controlling module 1111 of the satellite hub 1110 is configured for obtaining, or shaping, a first flow 1120*a* of the outgoing data being transmitted from the satellite hub 1110, such that said first flow 1120*a* follows a predetermined traffic profile. To be transmitted via the forward satellite link FWD, the first flow 1120*a* of the outgoing data is required to follow said predetermined traffic profile. The predetermined traffic profile may depend on the overall quality of the forward satellite link FWD connectivity, and/or on parameters of the at least one remote systems 1200, and/or on settings of the satellite hub 1110 itself. To obtain the predetermined traffic profile, the first traffic controlling module 1111 may, for each data packet of the outgoing data, transfer the data packet of the outgoing data, reroute it, delay it, or reject it. The obtaining, or shaping, of the first flow 1120*a* is made in real-time to adopt the predetermined traffic profile.

More particularly, obtaining the first flow may be equivalent to traffic shaping, or packet shaping, It is a congestion management method that regulates network data transfer by delaying the flow of, or even dropping, less important or less desired packets. It is used to optimize network performance by prioritizing certain traffic flows and ensuring the traffic rate does not exceed the bandwidth limit. Regulating the flow of packets into a network is known as data transfer throttling. Regulation of the flow of packets out of a network is known as rate limiting. The traffic shaping to obtain the predetermined traffic profile is performed in the transport layer of the network, and data transfer is generally done using a TCP/IP protocol.

The virtual hub module 1300 is located between the network 1400 and the gateway 1100. The virtual hub module 1300 is configured for forwarding, from the network 1400, the outgoing data to the satellite hub 1110. The second traffic controlling module 1311 of the virtual hub module is configured for obtaining a second flow 1120*b* of the outgoing data being forwarded from the virtual hub module 1300, such that said second flow 1120*b* is unchanged by the first traffic controlling module 1111. The second traffic module 1311 will, for each data packet of the outgoing data, transfer the data packet of the outgoing data, reroute it, delay it, or reject it. Thus, the second flow 1120*b* may be shaped by the second traffic controlling module 1311 to correspond to the predetermined traffic profile as required by the first traffic controlling module 1111 of the satellite hub. Since the first flow 1120*a* is coinciding with the second flow 1120*b*, obtaining the first flow 1120*a* is not performed sequentially after obtaining the second flow 1120*b* but simultaneously.

Since the virtual hub module 1300 interfaces the outgoing data with the satellite hub 1110 and the second flow 1120*b* of the outgoing data corresponds to the predetermined traffic profile of the first traffic module 1111 included in the satellite hub 1110, the outgoing data as obtained in the second flow 1120*b* is unchanged by the first traffic controlling module 1111. The first traffic controlling module 1111 may be effectively bypassed in its role, and the given types of services initially constrained by the choice of the satellite hub 1110 is no more restricted by it.

In one embodiment, the virtual hub module 1300 may be further configured for forwarding, from the network 1400, the outgoing data to another satellite hub 1160 including another traffic controlling module 1161 different from the first traffic controlling module 1111. Additionally or alternatively, the another satellite hub 1160 may be comprised by another gateway 1150. Also, the virtual hub module 1300 may be configured for interfacing with the satellite hub 1110 transmitting the outgoing data via the Ku-band, the C-band, or the Ka-band. In that manner, thanks to bypassing the first traffic controlling module 1311, the virtual hub module 1300 may allow the provision of multi-satellite, multi-band, and/or multi-technology services.

The virtual hub module 1300 may be implemented to provide IP communication services to multiple users. The virtual hub module 1300 may route the users IP traffic from and to different satellite hubs through secured tunnels. Since the users of the virtual hub module 1300, e.g. satellite, satellite teleport, and satellite hub operators, may benefit from the multi-satellite, multi-technology, multi-frequency band, and/or multi-orbital location features of the virtual hub module 1300, said users may optimize their unused capacity, and extend their geographical coverage while reducing costs.

In one embodiment, the virtual hub module 1300 may be cloud-based and be accessible in a Platform-as-a-Service approach trough the network 1400. For example, the virtual hub module 1300 may interface to any satellite hub 1110 comprising the compatible APIs and allowing Machine-to-Machine command and control functions, e.g. terminal provisioning, activation, suspension and decommissioning, terminal information collection, change of Service Level Agreement, etc.

In embodiments according to the invention, various service types may be provided to the users. The various types may be any one of: dedicated services, contended services with Peak Information Rate and Committed Information Rate, volume-based voucher shared services, time-based voucher services, Fair Usage Policy-based shared services, Virtual Networks Operator services, multicast, back-up services, high availability services. The skilled person will understand that the types of services provided are not limited by the above list and that the types of services provided may be a "mix-and-match" of the above.

At least one remote system of the remote systems 1200 may be a polling system 1200'. The virtual hub module 1300 may further include a performance metering module (not shown) configured for metering a connectivity performance of the polling system 1200' via the forward satellite link FWD and the return satellite link RTN. The polling system 1200' may serve as a point of control established in order to check the connectivity quality. It may allow the users of the virtual hub module 1300 to monitor connectivity between the network 1400 and remote systems 1200, and to gather information related to service degradation or deviations from nominal performances.

The connectivity performance of the polling system may be metered using the Return Trip Time (RTT) and/or speed tests in order to assess with direct measurements the level of congestion in the outgoing data. In one embodiment, the polling system 1200' may be equipped with 24/7 reliable power supply to ensure there are no false signals just due to local power failure. In another embodiment, there may be more than one polling system 1200' among the plurality of remote systems 1200. Additionally or alternatively, the performance metering module may be further configured for sending a warning message to the users upon metering a level of the connectivity performance with the polling system 1200' below a predetermined level.

Figure 2:
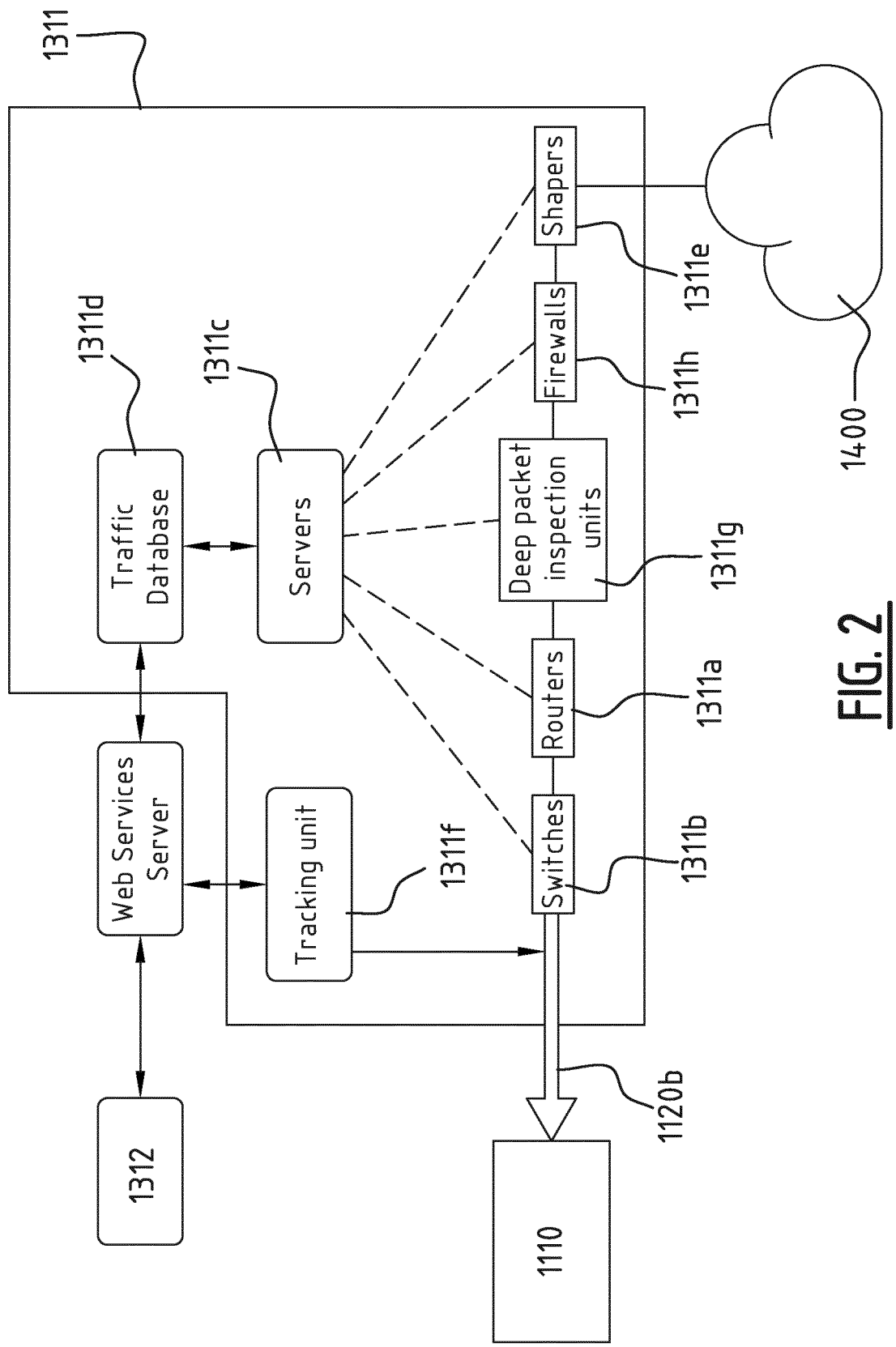
FIG. 2 shows a schematic view of an exemplary embodiment of a second traffic controlling module.

FIG. 2 shows a schematic view of an exemplary embodiment of a second traffic controlling module of a virtual hub module according to the present invention. The second traffic controlling module 1311 is configured for obtaining a second flow 1120*b* of the outgoing data being forwarded from the virtual hub module 1300 such that said second flow 1120*b* is unchanged by the first traffic controlling module 1111.

The second traffic controlling module 1311 may be seen as a passage through which all remote systems 1200 traffic data, to and from the network 1400, will pass through. The term "traffic data" may be defined as data which is outgoing and/or incoming between at least one of the remote systems 1200 and the network 1400. According to various embodiments, the second traffic controlling module 1311 may realize the following: shaping the traffic data via the forward satellite link FWD and via the return satellite link RTN for each of the plurality of remote systems 1200, allowing the measurement of traffic data volume for each of the plurality of remote systems 1200, enforcing a traffic policy. The second traffic controlling module 1311 may consist essentially of routers 1311*a*, switches 1311*b*, shapers 1311*e*, deep packet inspection units 1311*g*, firewalls 1311*h* and servers 1311*c*. The plurality of functions implemented for obtaining the second flow 1120*b* may run in virtual machines.

The second traffic controlling module 1311 may comprise a traffic database 1311*d* for storing a plurality of traffic policies. The second traffic controlling module 1311 may be configured for obtaining the second flow 1120*b* based on the plurality of traffic policies stored in the traffic database 1311*d*. The plurality of traffic policies may comprise bandwidth limiting policies, traffic priority policies, traffic rerouting policies, and/or outgoing data volume policies.

The plurality of traffic policies allows obtaining the second flow 1120*b* by influencing the actions of transferring, rerouting, delaying, and/or rejecting each data packet of the outgoing data. In other words, the traffic policies stored in the traffic database 1311*d* may be interpreted by the servers 1311*c* which enforce them onto the routers 1311*a*, switches 1311*b*, deep packet inspection units 1311*g*, firewalls 1311*h*, and/or shapers 1311*e*. The actions of transferring, rerouting, delaying, and/or rejecting, usually performed by the first traffic controlling module 1111 and which are now delegated to the second traffic controlling module 1312, are thus customizable through the plurality of traffic policies set up. Hence, the scopes of services provided may depend on the traffic policies stored in the traffic database 1311*d* instead of on the satellite hub 1110.

In one embodiment, the virtual hub module 1300 comprises a management and monitoring module 1312 connected to the second traffic controlling module 1311 and accessible to the user. Additionally, the management and monitoring module 1312 may be accessible by the user through the network 1400. In the embodiment of FIG. 2, the second traffic module 1311 and the management and monitoring module 1312 are interfaced via APIs implemented by web services servers (WSS).

The second traffic controlling module 1311 may further comprise a tracking unit 1311*f* connected to the management and monitoring module 1312 and configured for tracking, for each of the remote systems 1200, the outgoing data volume being transmitted. Optionally, the tracking unit 1311*f* may also track the incoming data.

The management and monitoring module 1312 may be further configured for modifying at least one traffic policy of the traffic policies stored in the traffic database 1311*d* or for storing another traffic policy in the traffic database, based on the user input data.

The plurality of traffic policies available to the user may be organized in classes. The types of services may be, as a consequence, defined following various desired services profiles by picking traffic policies from one or more classes. Since various services profiles may be defined, different levels of controls associated with access rights may also be provided to different users based on their categories and/or roles in the value chain between the network 1400 and the end-users. Thus, the second traffic controlling module 1311 may allow the user to create new types of services and services profiles that may not be otherwise provided for classical existing satellite hubs 1110.

Connection between the second traffic controlling module 1311 and the satellite hub 1110 may be done with static routing. Connection between the second traffic controlling module 1311 and the network 1400 may be done with Border Gateway Protocol. For routing purposes, the outgoing data, from the network 1400 to the at least one of the plurality of remote systems 1200, may use the normal routing tables. For the incoming data, from the at least one of the plurality of remote systems 1200 to the network 1400, source-based routing may be used.

Figure 3:
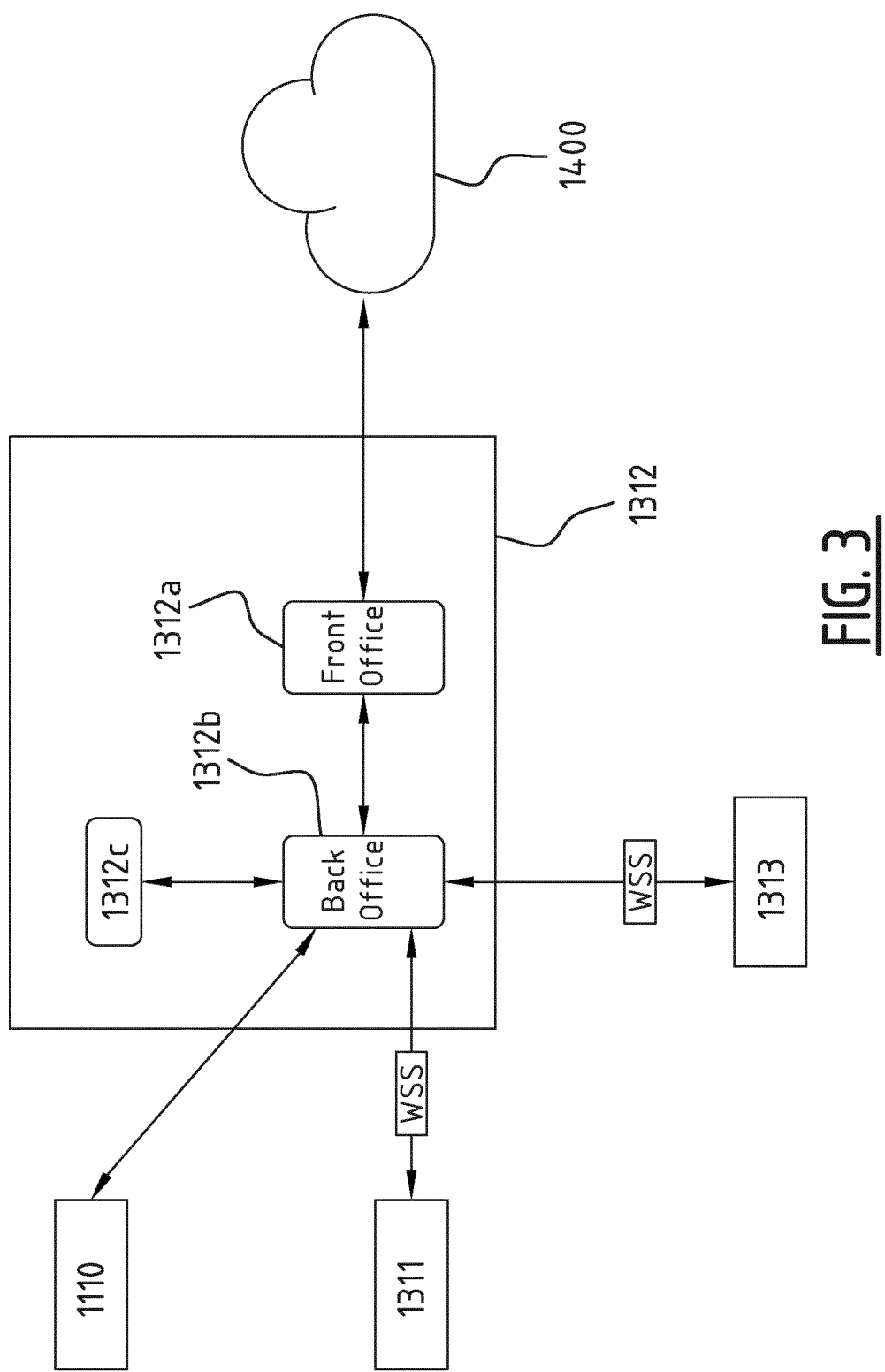
FIG. 3 shows a schematic view of an exemplary embodiment of a management and monitoring module.

FIG. 3 shows a schematic view of an exemplary embodiment of a management and monitoring module according to the present invention. The management and monitoring module 1312 is configured for managing and monitoring the communication between the network 1400 and the remote systems 1200.

For example, the management and monitoring module 1312 may include the management of at least one of the plurality of remote systems 1200 life cycle. The life cycle of the remote system 1200 may comprise the provisioning, decommissioning, activation, suspension, re-activation, and Service Level Agreement change. Also, the user and their access rights may be managed by the management and monitoring module 1312.

The second traffic controlling module 1311 may comprise a tracking unit connected to the management and monitoring module 1312 and configured for tracking, for each of the remote systems 1200, the outgoing data volume being transmitted. Optionally, the tracking unit may also track the incoming data. Data from the tracking unit of the second traffic module 1311 may be transmitted to a back office 1312*b* comprised by the management and monitoring module 1312. The data transmitted may help in monitoring the overall traffic data and, after processing, may help in managing the manual resets of consumed volume, and/or the generation and management of data volume vouchers.

For example, in one embodiment, the management and monitoring module 1312 may allow the generation and management of data volume vouchers by internet service providers (ISP) or local internet providers (L-ISP) to end-users. An ISP or L-ISP may provide vouchers accessible from its own web page for example. The generating of the data volume voucher includes the generation of a unique URL based on a unique identifier associated to the ISP or the L-ISP. The unique URL is generated by the management and monitoring module 1312 based on a unique identifier associated to the ISP or the L-ISP. The data volume voucher may allow granting connection to the network 1400 for a predefined amount of traffic data and/or period of time upon validation of the voucher code by, for example, a subscriber. In an embodiment, the ISP or the L-ISP may further define via the management and monitoring module 1312 services linked to the unique URL, and using this URL, provide subscribers with voucher codes associated to the services defined. Since the virtual hub module 1300 allows bypassing the first traffic controlling module 1111, the ISP or the L-ISP may provide the data volume vouchers to the end-users with similar conditions as operators upstream in the value chain between the network 1400 and the end-users.

The back office 1312*b* of the management and monitoring module may process data collected by the tracking unit 1311*f* and also from other components it is connected to, and implement the functions of the management and monitoring module 1312. The management and monitoring module 1312 may comprise a logging database 1312*c*, said logging database 1312*c* being configured for logging input data, the user input data in the embodiment of FIG. 3. The back office 1312*b* may allow the handling of the logging database 1312*c*. Additionally, the back office 1312*b* may allow managing and monitoring the interfacing of the virtual hub module 1300 with the satellite hub 1110, as well as the interfacing with the second traffic controlling module 1311 and with an activity processing module 1313 comprised by the virtual hub module 1300. In the embodiment of FIG. 3, the second traffic module 1311 and the management and monitoring module 1312, and the activity processing module 1313 and the management and monitoring module 1312, are interfaced via APIs implemented by web services servers (WSS).

The management and monitoring module 1312 may comprise a front office 1312*a* connected to the back office 1312*b*. In the embodiment of FIG. 3, the front office 1312*a* may provide an interface for the user to input the user input data which will be logged in the logging database 1312*c*. The user input data may be easily backtracked and processed afterwards for analysis purposes. Depending on the access rights provided to the virtual hub module 1300, various users may be allowed to manage their own Internet Protocol (IP) traffic and/or manage the remote systems 1200 through the front office 1312*a*, as well as monitoring them.

The access rights to the virtual hub module 1300 may be organized following a hierarchical structure. Credentials to the access rights corresponding to different services profiles may be stored in the logging database 1312*c*. The services profiles may be defined to provide different levels of controls associated with access rights to different users based on their categories and/or roles in the value chain between the network and the end-user; thereby affecting the credentials given and stored in the logging database 1312*c*. For example, depending on its credentials, a user may manage and monitor remote systems 1200 only on a single remote system level; another user may manage and monitor remote systems 1200 on a corporate level and have full managing and monitoring capabilities on the complete set of remote systems 1200 belonging to that specific corporation; yet another user may create sub-user profiles with credentials derived from their own. Depending on the credentials, the front office 1312*a* accessible by a specific user will show an adapted interface.

The management and monitoring module 1312 may generate management and monitoring data, optionally based on the user input data, in order to manage and monitor the different components it is connected to. For example, the input may be performed by the user, on the front office 1312*a*, from a terminal remotely connected to a cloud-based virtual hub module 1300 and accessible from the network 1400. The satellite hub 1110 may be further configured for receiving, from the virtual hub module 1300, the management and monitoring data.

The satellite hub 1110 may comprise a supervision database (not shown) for storing supervision data. The satellite hub 1110 is further configured for collecting, from the remote systems 1200, the supervision data in parallel with the outgoing data. The management and monitoring module 1312 is further configured for reading the supervision data of the supervision database. The supervision data may comprise at least one of: signal quality data at the satellite hub 1110, signal quality data at the at least one of the remote systems 1200, volume of traffic data exchanged between the satellite hub 1110 and the at least one of the remote systems 1200, temperature of the at least one of the remote systems 1200, satellite communication channel identification used by a mobile remote system 1200. It is to be noted that, provided there is no disturbance, the volume of traffic data exchanged between the satellite hub 1110 and the at least one of the remote systems 1200 should be comparable to the tracking by the tracking unit of the second traffic controlling module 1311.

Since the supervision data is separated from the traffic data, supervision data may be independently treated and follow, for example, a different communication protocol, e.g. for additional security, easier activity tracking, better efficiency. By allowing the management and monitoring module 1312 to read the supervision data of the supervision database, the management and monitoring module 1312 may store a copy of the supervision data within the virtual hub module 1300. Additionally, the stored copy of the supervision data may be accessed in a read/write manner and may be furthered processed by the management and monitoring module 1312.

Figure 4:
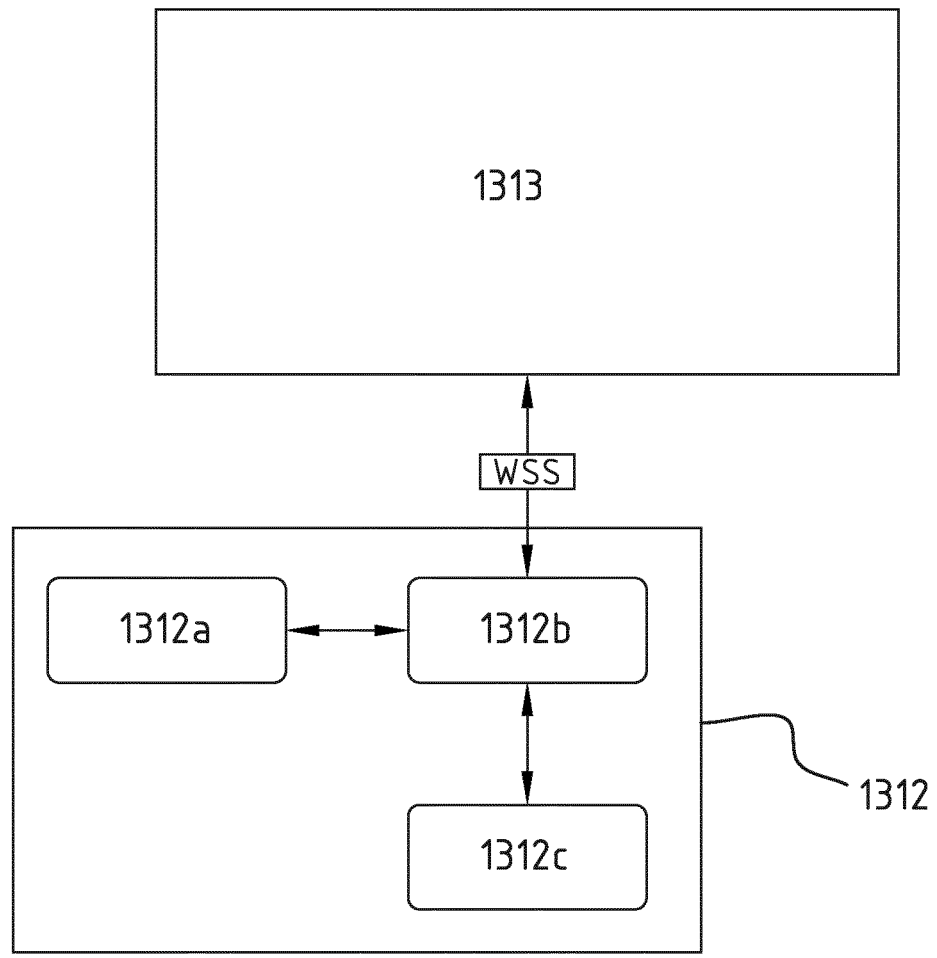
FIG. 4 shows a schematic view of an exemplary embodiment of an activity processing module.

FIG. 4 shows a schematic view of an exemplary embodiment of an activity processing module according to the present invention. In the embodiment of FIG. 4, the activity processing module 1313 and a management and monitoring module 1312 are interfaced via APIs implemented by web services servers (WSS). The activity processing module 1313 is configured for processing the user input data, logged in a logging database 1312c of the management and monitoring module 1312, according to a predetermined template.

Indeed, through a front office 1312a of the management and monitoring module 1312, the user may perform inputs. The inputs may be logged in the logging database 1312c of the management and monitoring module 1312 as user input data. Upon request, a back office 1312b of the management and monitoring module 1312 may transfer the requested user input data to the activity processing module 1313.

The user input data from the management and monitoring module 1312 may be processed in the activity processing module 1313 in order to isolate some predetermined inputs or categories of inputs among the user inputs. The predetermined template may indicate how the inputs are isolated. The predetermined template may be chosen depending on the categories of user inputs aimed at. Indeed, the user inputs may be related to different categories such as the management of remote systems life cycle (provisioning, decommissioning, activation, suspension, re-activation, Service Level Agreement change), the management of volumes (manual resets of outgoing data volume, generation and management of data volume vouchers), and the management of the virtual hub module users and access rights. Various predetermined templates may be used by the user. Optionally, a need for technical assistance may also be processed by the activity processing module 1313 in this manner Depending on the access rights of the user, use of a specific predetermined template may be restricted.

After processing of the user input data according to the predetermined template, the processed data may be consulted trough the front office 1312a of the management and monitoring module 1312.

Whilst the principles of the invention have been set out above in connection with specific embodiments, it is to be understood that this description is merely made by way of example and not as a limitation of the scope of protection which is determined by the appended claims.

The invention claimed is:

1. A satellite telecommunication system for effecting communication between a network and remote systems via a forward satellite link and a return satellite link, the satellite telecommunication system comprising:
a gateway configured for establishing the forward satellite link and the return satellite link to the remote systems, said gateway comprising:
a satellite hub configured for receiving outgoing data and for transmitting said outgoing data to at least one of the remote systems via the forward satellite link, said satellite hub including a first traffic controlling module, wherein the first traffic controlling module is configured for obtaining a first flow of the outgoing data being transmitted from the satellite hub such that said first flow follows a predetermined traffic profile; and
a virtual hub module configured for forwarding, from the network, the outgoing data to the satellite hub, said virtual hub module including a second traffic controlling module, wherein the second traffic controlling module is configured for obtaining a second flow of the outgoing data being forwarded from the virtual hub module such that said second flow is unchanged by the first traffic controlling module.

2. The satellite telecommunication system according to claim 1, wherein the virtual hub module is further configured for forwarding, from the network, the outgoing data to another satellite hub including another traffic controlling module different from the first traffic controlling module.

3. The satellite telecommunication system according to claim 2, wherein the another satellite hub is comprised by another gateway.

4. The satellite telecommunication system according to claim 1, wherein the second traffic controlling module comprises a traffic database for storing a plurality of traffic policies, and wherein the second traffic controlling module is configured for obtaining the second flow based on the plurality of traffic policies.

5. The satellite telecommunication system according to claim 4, wherein the plurality of traffic policies comprises bandwidth limiting policies, traffic priority policies, traffic rerouting policies, and/or outgoing data volume policies.

6. The satellite telecommunication system according to claim 1, wherein the virtual hub module further includes a management and monitoring module, said management and monitoring module being configured for managing and monitoring the communication between the network and the remote systems.

7. The satellite telecommunication system according to claim 6, wherein the management and monitoring module is further configured for generating and managing a data volume voucher upon request by a user, wherein the generating of the data volume voucher includes the generation of a unique URL based on a unique identifier associated to the user.

8. The satellite telecommunication system according to claim 6, wherein the second traffic module comprises a tracking unit connected to the management and monitoring module and configured for tracking, for each of the remote systems, the outgoing data volume being transmitted.

9. The satellite telecommunication system according to claim 6, wherein the satellite hub further comprises a supervision database for storing supervision data, wherein the satellite hub is further configured for collecting, from the remote systems, the supervision data in parallel with the outgoing data, and wherein the management and monitoring module is further configured for reading the supervision data of the supervision database.

10. The satellite telecommunication system according to claim 9, wherein the management and monitoring module comprises a logging database, said logging database being configured for logging the user input data.

11. The satellite telecommunication system according to claim 10, wherein the virtual hub module further includes an activity processing module configured for processing the user input data, logged in the logging database of the management and monitoring module, according to a predetermined template.

12. The satellite telecommunication system according to claim 4, wherein the management and monitoring module is further configured for modifying at least one traffic policy of the traffic policies stored in the traffic database or for storing another traffic policy in the traffic database, based on the user input data.

13. The satellite telecommunication system according to claim 1, wherein at least one remote system of the remote systems is a polling system, and wherein the virtual hub module further includes a performance metering module configured for metering a connectivity performance of the polling system via the forward satellite link and the return satellite link.

14. The satellite telecommunication system according to claim 13, wherein the performance metering module is further configured for sending a warning message to the user upon metering a level of the connectivity performance below a predetermined level.

15. The satellite communication system according to claim 1, wherein the satellite hub is configured for transmitting the outgoing data via the Ku-band, the C-band, or the Ka-band.

16. A virtual hub comprising: a virtual hub module for a gateway of a satellite telecommunication system for effecting communication between a network and remote systems via a forward satellite link and a return satellite link, wherein the gateway is configured for establishing the forward satellite link and the return satellite link to the remote systems, wherein the gateway further comprises a satellite hub configured for receiving outgoing data and for transmitting said outgoing data to at least one of the remote systems via the forward satellite link, said satellite hub including a first traffic controlling module, wherein the first traffic controlling module is configured for obtaining a first flow of the outgoing data being transmitted from the satellite hub such that said first flow follows a predetermined traffic profile, wherein the virtual hub module is configured for forwarding, from the network, the outgoing data to the satellite hub, said virtual hub module including a second traffic controlling module, and wherein the second traffic controlling module is configured for obtaining a second flow of the outgoing data being forwarded from the virtual hub module such that said second flow is unchanged by the first traffic controlling module.

\* \* \* \* \*